UNITED STATES PATENT OFFICE.

BARNARD HENRY KRONER, OF MOUNT STERLING, ILLINOIS, ASSIGNOR OF ONE-HALF TO HENRY GRUNDER, OF SAME PLACE.

STOVE-POLISH.

SPECIFICATION forming part of Letters Patent No. 367,110, dated July 26, 1887.

Application filed August 18, 1885. Serial No. 174,737. (Specimens.)

*To all whom it may concern:*

Be it known that I, BARNARD HENRY KRONER, of Mount Sterling, in the county of Brown and State of Illinois, have invented certain new and useful Improvements in Stove Blacking and Polish; and I do hereby declare the following to be a full, clear, and exact description of the invention, such as will enable others skilled in the art to which it pertains to make and use it.

My invention relates to a stove blacking or polish.

The improvement consists in the combination of certain ingredients, which are compounded together for producing the blacking or polish.

In the preparation of the compound the following ingredients, in about the proportions specified, are used—namely: Benzine japan, or japan having benzine as the thinning agent, one-half pint; turpentine japan, known as "Japan varnish," one-half pint; molasses, one-quarter pint; plumbago, five (5) pounds; water sufficient to make a gallon of the mixture. These ingredients are thoroughly mixed together, and the compound is then ready for use.

I am aware that plumbago and asphaltum varnish (including both turpentine and naphtha) have been used together as a stove-polish, and that molasses has been used in a stove-polish with plumbago, and do not claim such, broadly, as my invention.

Having thus described my invention, what I claim, and desire to secure by Letters Patent, is—

A stove blacking or polish composed of benzine japan, turpentine japan, molasses, plumbago, and water, in or about the proportions hereinbefore specified.

In testimony whereof I affix my signature in presence of witnesses.

BARNARD HENRY KRONER.

Witnesses:
FRANK ORR,
HENRY GRUNDER,
JAS. A. COX.